United States Patent Office 3,518,253
Patented June 30, 1970

3,518,253
(CARBOXYCYCLOALKYL)ACYL-
AMINOPENICILLINS
George R. Fosker, Horsham, John Herbert Charles Nayler, Dorking, and Harry Smith, Maplehurst, near Horsham, England; said Fosker assignor to Beecham Group Limited, Brentford, England, a British company
No Drawing. Continuation of application Ser. No. 623,845, Mar. 17, 1967. This application May 2, 1968, Ser. No. 726,249
The portion of the term of the patent subsequent to May 16, 1984, has been disclaimed
Int. Cl. C07d 99/16, 99/20
U.S. Cl. 260—239.1                                   8 Claims

ABSTRACT OF THE DISCLOSURE

Disclosed are (carboxycycloalkyl)acylaminopenicillins useful against certain microorganisms of the genus Pseudomonas.

---

This application is a continuation of application 623,845, filed Mar. 17, 1967.

This invention relates to new penicillins.

In U.S. patent application No. 480,477, now Pat. 3,320,240, there have been described and claimed new penicillins of the general formula:

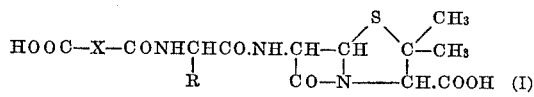

and nontoxic salts thereof, where R is an alkyl, aralkyl, aryl or heterocyclic group which may be substituted and X is a direct linkage or a divalent aliphatic, aromatic or heterocyclic radical which may be substituted.

These compounds are of value as antibacterial agents, as nutritional supplements in animal food, as agents for the treatment of mastitis in cattle and as therapeutic agents in poultry and animals, including man, in the treatment especially of infectious diseases caused by Gram-positive and Gram-negative bacteria.

We have now found that certain compounds falling within the general Formula I above have particularly desirable properties especially in respect of their activity against certain microorganisms of the genus Pseudomonas.

Accordingly, the present invention provides new penicillins of the general formula:

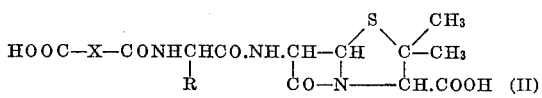

and nontoxic salts thereof, where R is phenyl, substituted phenyl, or thienyl group which may be substituted and X is a divalent radical derived from a cyclopropane, cyclobutane, cyclopentane, cyclopentene, cyclohexane, cyclohexene or cyclohexadiene ring system, or from a 5- or 6-membered saturated or unsaturated heterocyclic ring containing a single heteroatom which may be either oxygen or sulphur. Any of these rings may carry one or more substituents including halogen atoms, lower alkyl groups, oxo groups, and additional carboxyl groups, while in the cyclohexane, cyclohexene, and cyclohexadiene rings a bridge consisting of an oxygen atom, a divalent oxycarbonyl radical (—O—CO—), or a divalent hydrocarbon radical containing one or two carbon atoms may optionally be present.

The salts are nontoxic salts including nontoxic metallic salts such as sodium, potassium, calcium and aluminum, ammonium and substituted ammonium salts, e.g., salts of such nontoxic amine as trialkylamines, including triethylamine, procaine, dibenzylamine, N-benzyl-beta-phenethylamine, 1-ephenamine, N,N'-dibenzylethylenediamine, dehydroabietylamine, N,N' - bis-dehydroabietylethylenediamine, and other amines which have been used to form salts with benzylpenicillin.

The compounds of the present invention may be prepared by any of the processes described in said U.S. Pat. No. 3,320,240, a particularly convenient method being reacting an α-amino-penicillin of the general formula:

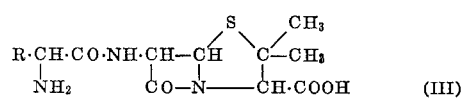

with a reactive derivative of the dicarboxylic acid HOOC—X—COOH where R and X are as hereinbefore defined. The reactive derivative may be a cyclic anhydride

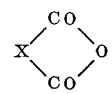

or a bis acid chloride. Examples of such cyclic anhydrides are:

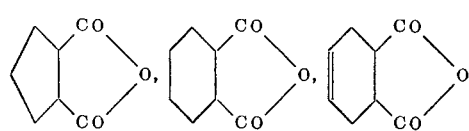

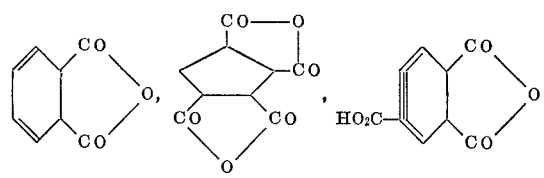

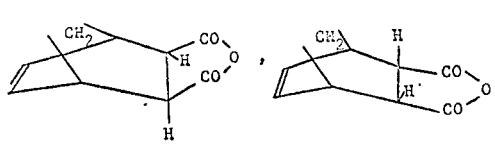

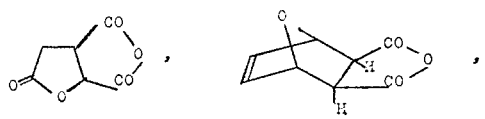

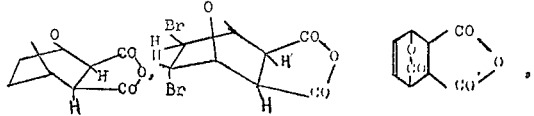

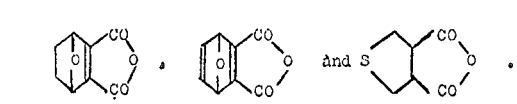

The novel penicillins of the present invention are capable of existing in a number of stereoisomeric forms, since not only is the α-carbon atom of the side-chain asymmetric but there are usually several centres of asymmetry in the divalent radical X. It is to be understood that the invention includes all such stereoisomers.

The following examples illustrate the invention:

EXAMPLE 1

Sodium 6-[D-α-(cis-2-carboxy cyclohexane-1-carbamido)-phenylacetamido]penicillanate A solution of cis cyclohexane 1,2 dicarboxy anhydride (1.5 g.) in dioxan (50 ml.) was added gradually to a stirred solution of 6[D(—)α-amino phenyl acetamido] penicillanic acid trihydrate (4.0 g.) in water (50 ml.) containing triethylamine (1.4 ml.), the pH being maintained at 7.5 to 8.0 by simultaneous addition of a further 1.4 ml. of triethylamine. The mixture was stirred for 3 hours and then concentrated under reduced pressure and temperature below 20° to a volume of about 45 ml. Methyl isobutyl ketone (50 ml.) was added and the mixture was stirred vigorously whilst sufficient dilute hydrochloric acid was added to bring the aqueous phase to pH 2. The layers were separated and the organic one was washed with water (50 ml.) followed by saturated brine (2 x 75 ml.). A 2 N solution of sodium 2-ethylhexoate in methyl isobutyl ketone was added gradually until no further solid separated, then the precipitate was collected, washed thoroughly with dry ether, and dried in vacuo to give the sodium salt of the penicillin (2.9 g.). It was estimated by colorimetric assay with hydroxylamine to be 98% pure and inhibited several strains of *Pseudomonas pyocyanea* at a concentration of 50 mcg./ml.

EXAMPLE 2

Sodium 6-[D-α-(cis-2-carboxy cyclohex-4-ene-1-carbamido)-phenylacetamido]penicillanate A solution of cis cyclohex-4-ene 1,2 dicarboxy anhydride (1.5 g.) in acetone (40 ml.) was added gradually to a stirred solution of 6[D(—)-α-amino phenyl acetamido] penicillanic acid trihydrate (4.0 g.) in water (50 ml.) containing acetone (10 ml.) and triethylamine (1.4 ml.), the pH being maintained at 7.5 to 8.0 by simultaneous addition of a further 1.4 ml. of triethylamine. The mixture was stirred for 3 hours and then concentrated under reduced pressure and temperature below 20° to a volume of about 50 ml. The concentrate was cooled to 0° C., ice-cold ethyl acetate (100 ml.) was added, and the mixture was stirred vigorously whilst sufficient dilute hydrochloric acid was added to bring the aqueous phase to pH 2. The layers were separated and the organic one was washed with water (50 ml.) followed by saturated brine (2 x 100 ml.). A 2 N solution of sodium 2-ethyl hexoate in isopropyl alcohol was added gradually until no further solid separated, then the precipitate was collected, washed thoroughly with dry ether, and dried in vacuo to give the sodium salt of the penicillin (4.5 g.), estimated by colorimetric assay to be 99% pure.

EXAMPLE 3

Sodium 6[D-α-(endo 3-6 endomethylene cyclohex-4-ene cis - 2-carboxy-1-carbamido)phenyl acetamido]penicillanate The sodium salt of the penicillin (5.1 g.), estimated by colorimetric assay to be 90% pure, was prepared as described in Example 2 when cis cyclo hex-4-ene 1-2 dicarboxy anhydride was replaced by endo-3,6-endomethylene cyclohex-4-ene cis 1-2 dicarboxy anhydride (1.6 g.) except that the organic phase containing the penicillin free acid was dried over anhydrous calcium sulphate for 24 minutes instead of washing with saturated brine solution.

EXAMPLE 4

Sodium 6-[D-α-(exo 3-6 endomethylene cyclohex-4-ene cis - 2-carboxy-1-carbamido)-phenyl acetamido]penicillanate The sodium salt of the penicillin (4.5) estimated by colorimetric assay to be 98% pure, was prepared exactly as in Example 3 when endo-3,6-endomethylene cyclohex-4-ene 1-2 dicarboxy anhydride was replaced by exo 3,6 endo methylene cyclohex-4-ene 1-2 dicarboxy anhydride (1.6 g.).

EXAMPLE 5

Sodium 6-[D-α-(cis-2-carboxy cyclohex-3,5-diene-1-carbamido)-phenylacetamido]penicillanate The sodium salt of the penicillin (4.0 g.), estimated by colorimetric assay to be 90% pure, was prepared as described in Example 2 when cis cyclohex-4-ene-1,2-dicarboxy anhydride was replaced by cis cyclohex-3-5-diene-1,2-dicarboxy anhydride (3.0 g.).

EXAMPLE 6

Sodium 6[D-α-(trans-2-carboxy cyclohex-3,5-diene-1-carbamido)-phenylacetamido]penicillanate The sodium salt of the penicillin (4.1 g.), estimated by colorimetric assay to be 99% pure, was prepared as described in Example 2 when cis cyclohex-4-ene-1,2-dicarboxy anhydride was replaced by trans cyclohex-3,5-diene-1,2-dicarbonyl chloride (2.1 g.).

EXAMPLE 7

Sodium 6[D-α-(cis-2-carboxy cyclohex-1-ene-1-carbamido)phenylacetamido]penicillanate The sodium salt of the penicillin (3.9 g.) estimated by colorimetric assay to be 96% pure, was prepared as described in Example 1 when cis cyclohexane-1,2-dicarboxy anhydride was replaced by cis cyclohex-1-ene-1,2-dicarboxy anhydride.

EXAMPLE 8

Sodium 6[D-α-(cis cis cis cis-2,3,4-tricarboxy cyclopentane-1-carbamido)phenylacetamido]penicillanate The sodium salt of the penicillin (4.2 g.) estimated by colorimetric assay to be 99% pure, was prepared as described in Example 2 when cis cyclohex-4-ene-1,2-dicarboxy anhydride was replaced by cis cis cis cyclopentane-1,2,3,4-bis(dicarboxy anhydride) (2.1 g.).

EXAMPLE 9

Sodium 6[D-α-(cis-2-carboxy-3-methylcyclohex-4-ene-1-carbamido)phenylacetamido]penicillanate The sodium salt of the penicillin (4.5 g.), estimated by colorimetric assay to be 98% pure, was prepared as described in Example 2 when cis cyclohex-4-ene-1,2-dicarboxy anhydride was replaced by cis-3-methylcyclohex-4-ene-1,2-dicarboxy anhydride (1.7 g.).

EXAMPLE 10

Sodium 6[α(cis-2-carboxy cyclohex-4-ene-1-carbamido) 2-thienylacetamido]penicillanate The sodium salt of the penicillin (3.0 g.) estimated by colorimetric assay to be 86% pure, was prepared as decribed in Example 2 when 6[D(—)α-aminophenylacetamido]penicillanic acid trihydrate was replaced by 6[(-)α - amino - 2 - thienylacetamido]penicillanic acid (3.6 g.).

EXAMPLE 11

6[D-α-(6-carboxy-exo-2,5-endoxo-cyclohex-3-ene 1 carbamido)phenylacetamido]penicillanic acid A solution of exo-2,5-endoxo-cyclohex-3-ene-cis-1,6-dicarboxylic anhydride (3.3 g.) in acetone (50 ml.) was added gradually to a stirred solution of 6[D(—)-α-aminophenylacetamido]penicillanic acid trihydrate (8.0 g.) in water (50 ml.) containing triethylamine (2.8 ml.), the pH being maintained at 7.5 to 8.0 by simultaneous addition of a further 2.8 ml. of triethylamine. The mixture was stirred for 2 hours and then concentrated under reduced pressure and temperature below 20° C. to about 25 ml. The clear solution was cooled to 0° and was stirred whilst sufficient dilute hydrochloric acid was added to adjust the mixture to pH 2. The fine white precipitate was filtered, washed with ice-cold water (2 x 10 ml.) and finally dried in vacuo over phosphorous pentoxide to give the penicillanic acid (8.4 g.). (Found: C, 54.6; H, 5.7; N, 8.3; S, 6.3. $C_{24}H_{25}N_3O_8S$, $0.5H_2O$ requires C, 54.9; H, 5.0; N, 8.0; S, 6.1%.)

EXAMPLE 12

Sodium 6[D-α-(6-carboxy-exo-2,5-endoxo-cychlohex-3-ene-1-carbamido)phenylacetamido]penicillanate A solution of exo-2,5-endoxo-cyclohex-3-ene-cis - 1,6 - dicarboxylic anhydride (3.3 g.) in acetone (50 ml.) was added gradually to a stirred solution of 6[D(—)-α-aminophenylacetamido]penicillanic acid trihydrate (8.0 g.) in water (50 ml.) containing triethylamine (2.8 ml.), the pH being maintained at 7.5 to 8.0 by simultaneous addition of a further 2.8 ml. of triethylamine. The mixture was stirred for 2 hours and then concentrated under reduced pressure and temperature below 20° C. to a volume of about 50 ml. The concentrate was chilled to 0° C. and ice-cold ethyl acetate (150 ml.) was added and the mixture was vigorously stirred whilst sufficient dilute hydrochloric acid was added to adjust the aqueous phase to pH 2. The layers were separated, the organic phase was washed with water (2 x 50 ml.), and then dried over magnesium sulphate for 15 minutes. After filtration, the magnesium sulphate was thoroughly washed with dry ethyl acetate and the clear, colourless filtrate treated with a 2 N solution of sodium 2-ethylhexoate in isopropyl alcohol until no further solid separated. The white precipitate was collected, washed throughly with dry ether, and dried in vacuo to give the sodium salt of the penicillin (9.2 g.), which was estimated by colorimetric assay with hydroxylamine to be 93% pure.

EXAMPLE 13

Sodium 6[L-α(6-carboxy-exo-2,5-endoxo-cyclohex-3-ene-1-carbamido)phenylacetamido]penicillanate The sodium salt (7.0 g.), estimated by colorimetric assay with hydroxylamine to be 71% purs, was prepared exactly as in Example 12 when 6[D(—)-α-aminophenylacetamido]penicillanic acid trihydrate was replaced with 6[L - (+) - α - aminophenylacetamido]penicillanic acid (7.0 g.).

EXAMPLE 14

Sodium 6[D-α(6-carboxy-exo-2,5-endoxo-cyclohexane-1-carbamido)phenylacetamido]penicillanate A solution of exo - 2,5 - endoxo - cyclohexane-cis-1, 6-dicarboxylic anhydride (1.7 g.) in acetone (25 ml.) was added gradually to a stirred solution of 6[D(—)-α-aminophenylacetamido]penicillanic acid trihydrate (4.0 g.) in water (30 ml.) containing triethylamine (1.4 ml.), the pH being maintained at 7.5 to 8.0 by simultaneous addition of a further 1.4 ml. of triethylamine. The mixture was stirred for 2 hours and then concentrated under reduced pressure and temperature below 20° C. to a volume of about 25 ml. Ethyl acetate (75 ml.) was added and the mixture was stirred vigorously whilst sufficient dilute hydrochloric acid was added to bring the aqueous phase to pH 2. The layers were separated and the organic phase was washed with water (30 ml.), followed by saturated brine (2 x 50 ml.). A 2 N solution of sodium 2-ethylhexoate in isopropyl alcohol was added generally until no further solid separated, then the white precipitate was collected, washed thoroughly with dry ether, and dried in vacuo to give the sodium salt of the penicillin (3.8 g.). It was estimated by colorimetric assay to be 79% pure.

EXAMPLE 15

Sodium 6[D-α-(6-carboxy - exo - 2,5 - endoxo-trans-3,4-dibromo-cyclohexane - 1 - carbamido)phenylacetamido]penicillanate The sodium salt of the penicillin (4.9 g.) estimated by colorimetric assay with hydroxylamine to be 93% pure, was prepared as described in Example 14 when exo-2,5-endoxo-cyclohexane-cis-1,6-dicarboxylic anhydride was replaced by exo-2,5-endoxo-trans-3,4-dibromocyclohexane-cis-1,6-dicarboxylic anhydride (3.25 g.).

EXAMPLE 16

Sodium 6[D-α-(6-carboxy-exo-2,5-endoxo-cyclohex-1-ene-1-carbamido)phenylacetamido]penicillanate The sodium salt of the penicillin (7.3 g.), estimated by colorimetric assay to be 95% pure, was prepared exactly as described in Example 12 when exo-2,5-endoxo-cyclohex - 3 - ene-cis - 1,6-dicarboxylic anhydride was replaced by exo-2,5 - endoxo-cyclohex - 1 - ene-cis - 1,6-dicarboxylic anhydride (3.3 g.).

EXAMPLE 17

Sodium 6[D-α-(4-carboxy-furan-3-carbamido)phenylacetamido]penicillanate

The sodium salt (6.4 g.), estimated by colorimetric assay to be 81% pure, was prepared exactly as in Example 12 when exo-2,5-endoxo-cyclohex-3-ene-cis-1,6-dicarboxylic anhydride was replaced by the dimeric anhydride of furan-3,4-dicarboxylic acid (5.5 g.). This anhydride was prepared from furan-3,4-dicarboxylic acid and thionyl chloride in benzene at reflux., M.P. chars 210–250° C. (Found: C, 52.5; H, 1.7. $C_{12}H_4O_8$ requires C, 52.2; H, 1.4%) ($\bar{v}$ 1787 and 1870 cm.$^{-1}$.)

EXAMPLE 18

Sodium 6[D-α-(5-carboxy-γ-butyrolactone-4-carbamido)-phenylacetamido]penicillanate and sodium 6[D-α-(4-carboxy - γ - butyrolacetone-5-carbamido)phenylacetamido]penicillanate The mixture of isomeric sodium salts (4.0 g.) estimated by colorimetric assay to be 95% pure, was prepared exactly as in Example 14 when exo-2,5-endoxocyclohexane-cis-1,6-dicarboxylic anhydride was replaced by γ-butyrolactone-cis-4,5-dicarboxy anhydride (1.6 g.).

EXAMPLE 19

Sodium 6-[D-α-(trans-2-carboxy cyclopentane-1-carbamido)phenylacetamido]penicillanate The sodium salt of the penicillin (3.0 g.), estimated by colorimetric assay to be 101% pure, was prepared as described in Example 6 when trans cyclo hex-3,5-diene 1,2-dicarbonyl chloride was replaced by trans cyclopentane 1,2-dicarbonyl chloride (1.95 g.).

EXAMPLE 20

Sodium 6-[D-α-(cis-2-carboxy cyclopentane-1-carbamido)phenylacetamido]penicillanate The sodium salt of the penicillin (3.5 g.) estimated by colorimetric assay to be 98% pure, was isolated as detailed in Example 2 when cis cyclo hex-4-ene 1,2 dicarboxy anhydride was replaced by cis cyclopentane 1,2 dicarboxy anhydride (1.4 g.).

EXAMPLE 21

Sodium 6-[D-α-(1-carboxy cyclobutane-1-carbamido)phenylacetamido]penicillanate

The sodium salt of the penicillin (4.0 g.), estimated by colorimetric assay to be 100% pure, was isolated as described in Example 6 when trans cyclo hex-3,5-diene 1,2 dicarbonyl chloride was replaced by cyclobutane-1,1-dicarbonyl chloride (1.8 g.).

EXAMPLE 22

Sodium 6-[D-α-(cis-4-carboxy tetrahydrothiophene-3-carbamido)phenylacetamido]penicillanate The sodium salt of the penicillin was prepared exactly as detailed in Example 2 when cis cyclo hex-4-ene 1,2 dicarboxy anhydride was replaced by cis tetrahydrothiophene 3,4 dicarboxy anhydride.

EXAMPLE 23

Sodium 6-[α-(cis-2-carboxy cyclopentane-1-carbamido)-2-thienyl acetamido]penicillanate The sodium salt of the penicillin was isolated exactly as described in Example 10 when cis cyclo hex-4-ene 1,2-dicarboxy anhydride was replaced by cis cyclopentane 1,2 dicarboxy anhydride.

EXAMPLE 24

Sodium 6-[α-(cis-2-carboxy cyclopentane-1-carbamido)-3-thienyl acetamido]penicillanate The sodium salt of the penicillin was prepared as described in Example 23 when 6[(—)α-amino-2-thienyl acetamido]penicillanic acid was replaced by 6[α-amino-3-thienyl acetamido]penicillanic acid.

The following table illustrates the activity (Minimum Inhibitory Concentrations in μg./ml.) of a selection of the new penicillins of the present invention against two strains of Pseudomonas pyocyanea both of which are resistant to known penicillins up to at least 250 μg./ml.

| Example No. | MIC (μg./ml.) | |
|---|---|---|
| | Ps. pyo. A | Ps. pyo. R59 |
| 1 | 50 | 25 |
| 2 | 50 | 25 |
| 3 | 125 | 125 |
| 4 | 125 | 125 |
| 5 | 25 | 25 |
| 6 | 50 | 50 |
| 7 | 125 | 125 |
| 9 | 50 | 25 |
| 10 | 125 | 50 |
| 11, 12 | 12.5 | 12.5 |
| 14 | 50 | 50 |
| 15 | 125 | 50 |
| 16 | 250 | 125 |
| 18 | 250 | 125 |

What is claimed is:
1. A compound selected from the group consisting of a penicillin of the formula:

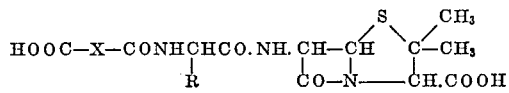

and nontoxic salts thereof, where R is phenyl, or thienyl and X is a divalent radical of cyclohexane, cyclohexene or cyclohexadiene, or each such substituted by methyl, endoxo, endomethylene or at least one halogen, cyclopentanone, 2-oxocyclopentanone, tetrahydrothiophene or 2-oxo-tetrahydrothiophene.

2. The compound of claim 1 which is 6-[D-α-(cis-2-carboxy cyclohexane-1-carbamido)phenylacetamido] penicillanic acid and nontoxic salts thereof.

3. The compound of claim 1 which is 6-[D-α-(cis-2-carboxy cyclohex-4-ene-1-carbamido)phenylacetamido] penicillanic acid and nontoxic salts thereof.

4. The compound of claim 1 which is 6-[D-α-(cis-2-carboxy cyclohex-3,5-diene-1-carbamido)phenylacetamido]penicillanic acid and nontoxic salts thereof.

5. The compound of claim 1 which is 6-[α-(cis-2-carboxy cyclohex-4-ene-1-carbamido)-2-thienylacetamido] penicillanic acid and non-toxic salts thereof.

6. The compound of claim 1 which is 6-[D-α-(6-carboxy-exo-2,5-endoxo-cyclohex-3-ene-1-carbamido) phenylacetamido]penicillanic acid and nontoxic salts thereof.

7. The compound of claim 1 which is sodium 6[D-α-(2-carboxy-exo-3,6-endoxo-cyclohex-3-ene-1-carbamido)phenylacetamido]penicillanate.

8. A compound of claim 1 which is selected from the group consisting of a penicillin of the formula:

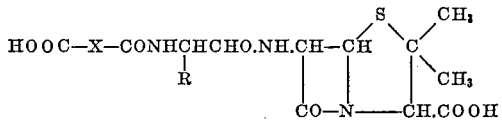

and nontoxic salts thereof, where R is phenyl or thienyl and X is selected from the group consisting of:

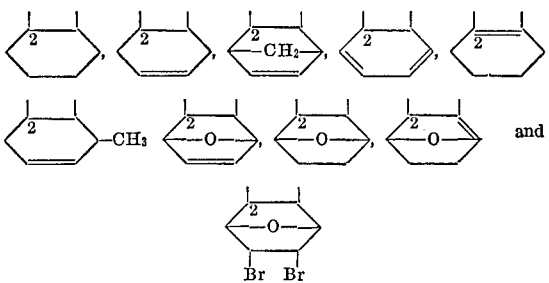

wherein the linkage marked above as being in the 2-position is to the —COOH group of the HOOC—X— moiety of the molecule.

References Cited
UNITED STATES PATENTS
3,320,240  5/1967  Fosker et al. _____ 260—239.1

NICHOLAS S. RIZZO, Primary Examiner

U.S. Cl. X.R.
260—999

UNITED STATES PATENT OFFICE
CERTIFICATE OF CORRECTION

Patent No. 3,518,253  June 30, 1970

George R. Fosker et al.

It is certified that error appears in the above identified patent and that said Letters Patent are hereby corrected as shown below:

Column 2, the sixth cyclic anhydride should read:

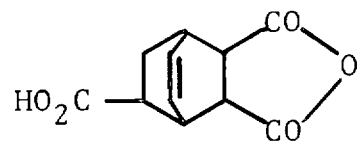

Signed and sealed this 6th day of October 1970.

(SEAL)
Attest:

Edward M. Fletcher, Jr.
Attesting Officer

WILLIAM E. SCHUYLER, JR.
Commissioner of Patents